W. W. BOULINEAU.
DIRIGIBLE SPOTLIGHT.
APPLICATION FILED JULY 6, 1921.
1,415,982.
Patented May 16, 1922.
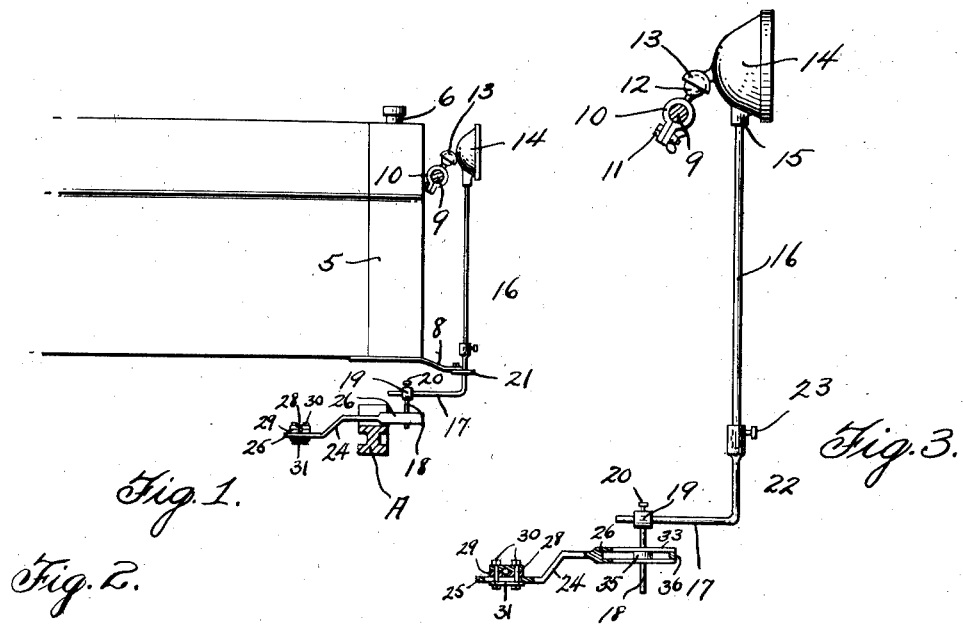
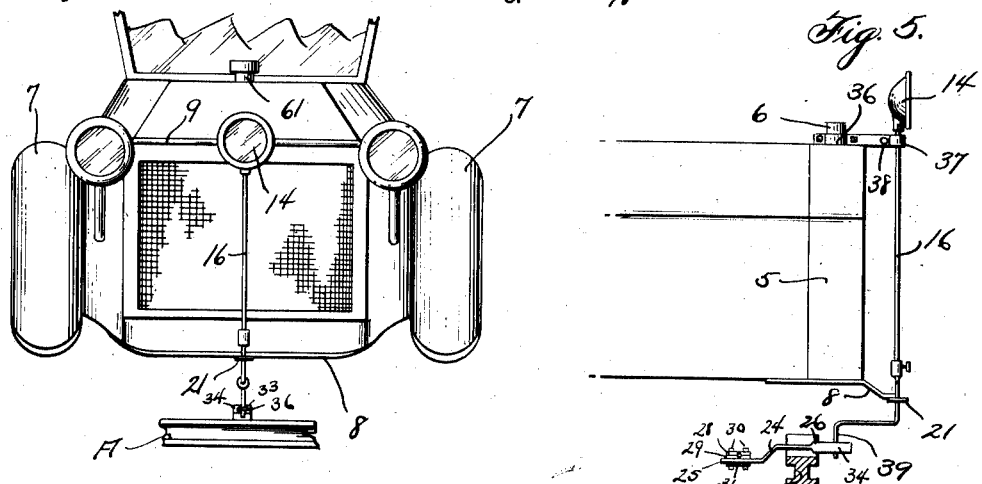
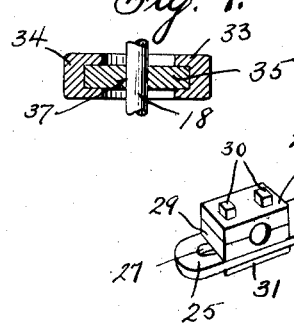
Inventor
W. W. Boulineau.
By Watson E. Coleman
Attorney

* UNITED STATES PATENT OFFICE.

WILLIAM W. BOULINEAU, OF CEDARTOWN, GEORGIA.

DIRIGIBLE SPOTLIGHT.

1,415,982.  Specification of Letters Patent.  Patented May 16, 1922.

Application filed July 6, 1921. Serial No. 482,660.

*To all whom it may concern:*

Be it known that I, WILLIAM W. BOULINEAU, a citizen of the United States, residing at Cedartown, in the county of Polk and State of Georgia, have invented certain new and useful Improvements in Dirigible Spotlights, of which the following is a specification, reference being had to the accompanying drawings.

This invention relates to dirigible lights for automobile, and more particularly to a dirigible spotlight.

It is an object of the invention to provide means whereby a conventional form of spotlight may be positioned centrally of the forward portion of an automobile and arranged for movement corresponding to the movement of the front wheels.

It is another object of the invention to provide means for rendering a spotlight dirigible and for positioning the spotlight adjacent the top of the radiator, whereby the light may be projected the same as if the spotlight was carried by the wind shield, and without requiring the operator to move the spotlight manually except through the medium of the steering mechanism.

It is another object of the invention to provide means for movably supporting a spotlight, said means being operatively connected to means carried by the steering mechanism, the connection preventing transmission of vibration from the axle to the spotlight supporting means.

With these and other objects in view the invention consists in the improved construction and arrangement of parts to be hereinafter more particularly described, fully claimed and illustrated in the accompanying drawings, in which:—

Figure 1 is a side elevation of a dirigible spotlight constructed in accordance with an embodiment of the invention and shown applied to an automobile, portions of the automobile being shown in section, Figure 2 is a front elevation of the structure shown in Figure 1, Figure 3 is an enlarged side elevation of the dirigible spotlight, Figure 4 is a perspective view of the operating arm, Figure 5 is a side elevation of another form of the invention, Figure 6 is a transverse sectional view through the adjustable clamp, and Figure 7 is a transverse sectional view through the bifurcated portion of the operating arm.

Referring to the drawings, 5 designates a conventional type of radiator, and 6 the neck of the radiator, the fenders 7 of the automobile having a portion thereof extending laterally of the lower end of the radiator which substantially forms a flange 8. The above described parts form no part of my invention, but are used in connection therewith.

Extending laterally of the radiator 5 and connected at its ends to the supporting means of the headlights of the automobile, is a brace or supporting rod 9, said rod being disposed slightly below the upper end of the radiator. Positioned centrally of the rod 9, is a clamp 10, the ends of the clamp being connected by a bolt 11. Projecting from the bight portion of the clamp 10 is a ball 12, which is adapted to be inserted in a socket 13, carried by the spotlight 14. By this means, the spotlight may not only be moved vertically, but horizontally, the ball and socket joined also assisting to hold the lamp in the proper position centrally of the radiator.

The spotlight 14 includes a socket member 15 which projects from the lower portion thereof, said socket member being adapted to receive one end of a supporting shaft 16. The shaft 16 is relatively long, so as to extend to the upper portion of the radiator. The lower end portion of the shaft 16 is extended inwardly substantially parallel to the bottom of the radiator as at 17, the length of the portion 17 varying according to the type of automobile on which the spotlight is used. An arm 18 having a sleeve 19 on one end is provided, said sleeve being adapted to receive the portion 17 of the shaft 16. A set screw 20 is mounted in the sleeve 19 so as to fasten the sleeve 19 to the portion 17 after the arm 18 has been adjusted to the point desired. Through the cooperation of the portion 17 and arm 18, a crank is substantially formed for oscillating the shaft 16.

Secured to the portion 8 of the fender is a bearing plate 21 having an opening for the reception of the lower portion of the shaft 16 adjacent the crank to prevent lateral movement of the main portion of the shaft. To render the shaft 16 adjustable in order to permit attachment of the device to various types of automobiles, the shaft 16 is separated adjacent the portion 18, and a socket 22 formed on the lower section of the shaft for the reception of the main portion of the shaft, a set screw 23 being carried by the socket to hold the sections of the shaft in various adjusted positions.

To actuate the shaft 16, an operating arm is provided, the end 25 of the arm being offset with respect to the end 26 of the arm so as to clear the front axle A of the automobile. The end portion 25 of the arm is provided with a longitudinally extending slot 27. A clamp including sections 28 and 29 is provided, said clamp being adapted to rest upon the upper surface of the end 25. Bolts 30 are adapted to be passed through the sections of the clamp and the slot 27. A holding plate 31 is engaged with the lower surface of the end portion 25 and is adapted to receive the ends of the bolts 30, the nuts 32 of the bolts being engaged with the plate so as to secure the clamp in the desired position at any point longitudinally of the slot 27.

The end portion 26 of the arm is enlarged and bifurcated, the inner face of each of the arms 33 and 34 of the bifurcation being grooved, said grooves communicating with a groove formed in the bight portion of the bifurcation, said grooves cooperating to provide a guide for the reception of a disc or roller 35. The end of the bifurcation is closed by a bar 36 so as to prevent disengagement of the roller from the guides. The roller or disc is provided with a central opening 37 adapted to receive the end of the shaft 16 or arm 18. The disc is not only rotatable longitudinally of the bifurcation, but on or circumferentially of the shaft 16 and arm 18 so that there is no danger of friction interfering with the movement of the mechanism. The sections 28 and 29 of the clamp are adapted to be engaged with the connecting rod of the steering mechanism, and the arm 24 adjusted according to the distance between the connecting rod and the end of the arm 18 and shaft 16. The bolts 30 are then tightened so as to firmly connect the arm to the connecting rod. By this means, the operating arm is rigidly connected to the connecting rod so that any movement of the connecting rod caused by actuation of the steering wheel will transmit similar motion to the arm 18 and the spotlight 14.

In Figure 5, another form of the invention is shown. This form consists in eliminating the rod 9 and providing a clamp 36 adapted to engage the neck 6 of the radiator, said clamp having a bearing 37 formed in its bight portion for the reception of the shaft 16. A bolt 38 or like fastening means is passed between the clamp 36 and the bearing 37, so as to cause the bearing to embrace the shaft 16. In this form of the invention, the socket 22 is omitted, as well as the arm 18. In place of the arm 18, the shaft 16 is made relatively long so as to permit the lower end portion of the shaft to be extended downwardly as at 39 to take the place of the adjustable arm 18. The end portion 39 of the shaft, similar to the arm 18, is adapted to extend through the opening 35 of the disc or roller 34, the opening being larger than the shaft.

In the operation of the device, when the steering mechanism is operated to change the direction of travel of the automobile, the arm 24 is moved with the connecting rod of the steering mechanism. This movement causes the end 39 of the arm 18 to move with the operating arm, thereby oscillating the shaft 16. In view of the movable disc 34, the arm 18 or end portion 33 will move longitudinally of the bifurcation as the arm 24 is being moved laterally, and in addition to preventing transmission of vibration of the shaft 16, the bifurcation and disc prevents binding of the various parts when the mechanism is in operation.

The advantage of the adjustable arm 18 is that by moving the arm longitudinally of the portion 17, or toward the front portion of the automobile, the angle at which the light is projected is increased, and by moving the arm in the opposite direction, the angle at which the light is projected is decreased. The use of the socket 22 also permits the main portion of the shaft 16 to be adjusted so as to position the spotlight at various angles. By this means, when the automobile is not in motion, and it is desired to project the light to one side, the set screw 23 may be loosened so as to permit movement of the main portion of the shaft 16 independently of the lower or crank portion.

From the foregoing it will be readily seen that this invention provides novel means for mounting a spotlight centrally of an automobile so as to project the rays of light at all times within the path of travel of the front wheels. The construction of the device is very simple so that it may be applied to any type of automobile without requiring alterations and in addition to this it eliminates the necessity of dirigible headlights as well as the use of dimmers for the headlights, as it permits the stationary headlights to be arranged so as to project a mild light at all times, as their use in travel through dark territory is not necessary with this novel form of dirigible spotlight.

I do not wish to be limited to the precise arrangement of the invention herein described, as changes may be made to accommodate for various purposes, without departing from the spirit of the invention.

What is claimed is:—

1. A dirigible spotlight for automobiles comprising a vertical shaft journaled at the forward intermediate portion of an automobile, a spotlight on the upper end of the shaft, the lower end of the shaft being extended beneath the automobile, an adjustable arm carried by the last mentioned end of the shaft, and an actuating arm connected to the steering means of the automobile, a connecting member rotatably mounted on the actuating arm, said connecting member being also rotatable on the adjustable arm.

2. A dirigible spotlight for automobiles comprising a brace adapted to be arranged for connection at its ends to the headlight supports of the automobile, a shaft, a spotlight carried by the shaft, a universal connection disposed between the spotlight and the brace, the lower end of the shaft being provided with crank means, an actuating arm carried by the steering means of the automobile, and means for movably connecting the crank means of the shaft to the actuating arm.

3. A dirigible spotlight for automobiles comprising bearing means disposed adjacent the top of the radiator of an automobile, a vertical shaft journaled in said bearing, bearing means carried by the automobile adjacent the lower portion of the radiator for the reception of a shaft, the lower end of said shaft being extended beneath the radiator substantially in parallel relation thereto, an arm adjustably mounted on the last mentioned end portion of the shaft, said arm being adjustable toward or away from the main portion of the shaft to increase or decrease the range of movement of the spotlight, and means carried by the steering means of the automobile for operatively connecting said adjustable arm to said steering means.

4. A dirigible spotlight for automobiles comprising a vertical shaft journaled on the forward portion of an automobile, a crank member positioned adjacent the lower end of the shaft, said crank member having a socket on one end for the reception of the lower end of the shaft, whereby the shaft may be held in various adjusted positions relative to the crank means, and means for operatively connecting the opposite end of the crank to the steering means of the automobile.

5. Means for connecting the dirigible illuminating means of an automobile to the steering mechanism, comprising an arm having a clamp adjustably mounted on one end of the arm, the opposite end of the arm being bifurcated, the arms of said bifurcation being provided with grooves for the reception of a movable connecting member, means closing the ends of the bifurcation to prevent disengagement of the connecting means, said connecting means being arranged for engagement with the illuminating means.

6. Means for connecting the dirigible illuminating means of an automobile to the steering mechanism, comprising an arm having a slot in one end, a sectional clamp slidable on said end of the arm, fastening means extending through the clamp and the slot for adjustably connecting the clamp to the arm, the opposite end of the arm being bifurcated, the walls of the bifurcation being grooved for the reception of a movable disc, said disc having an opening for a portion of the mechanism of the illuminating means, and means for closing the ends of the bifurcation to prevent disengagement of the disc from the grooves.

In testimony whereof I hereunto affix my signature.

WILLIAM W. BOULINEAU.